G. Westinghouse Jr.
Railway Frog.
No. 3,584. Reissued Aug. 3, 1869.
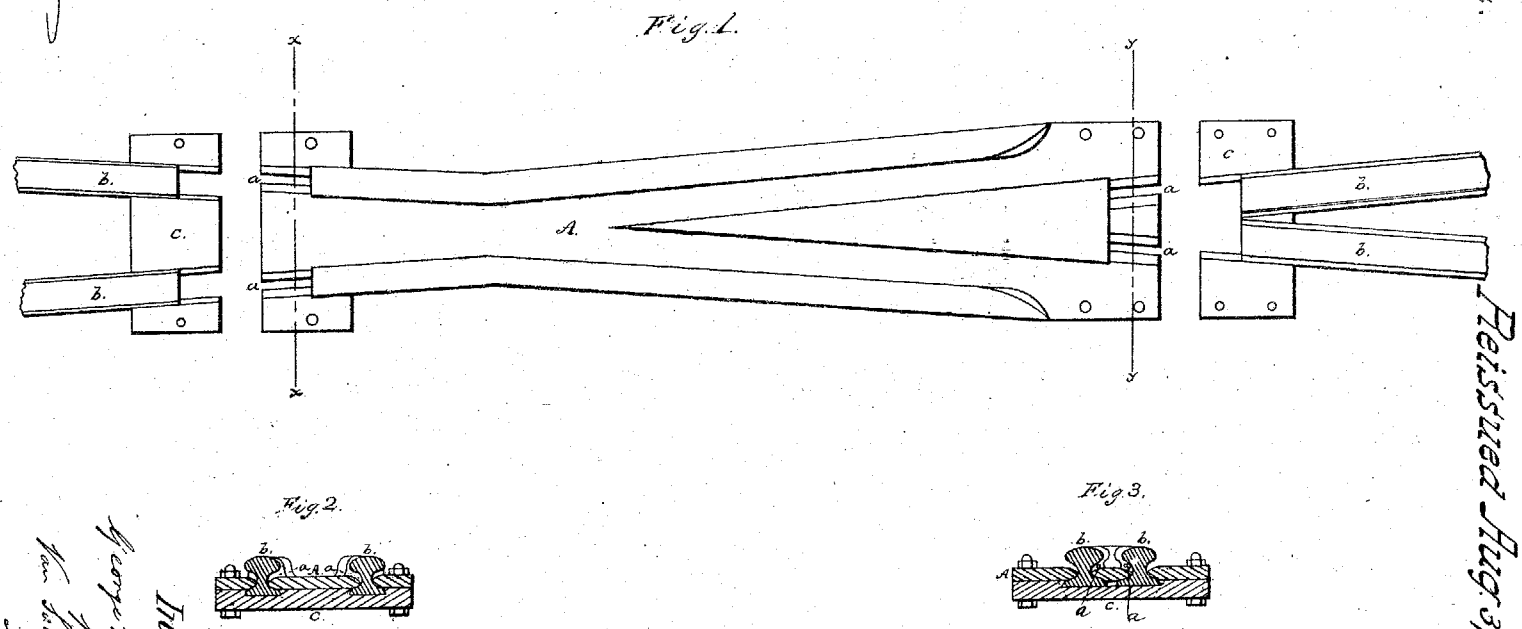
Witnesses.
Hermann Groz
Gustav Berg
Inventor.
George Westinghouse Jr
per
Van Santvoord & Hauff
Attys.

United States Patent Office.

GEORGE WESTINGHOUSE, JR., OF PITTSBURG, PENNSYLVANIA.

*Letters Patent No.* 76,365, *dated April* 7, 1868; *reissue No.* 3,584, *dated August* 3, 1869.

IMPROVED RAILWAY-FROG.

The Schedule referred to in these Letters Patent and making part of the same.

*To all whom it may concern:*

Be it known that I, GEORGE WESTINGHOUSE, JR., formerly of Schenectady, New York, now of Pittsburg, in the county of Allegheny, State of Pennsylvania, have invented a new and useful Improvement in Railroad-Frogs; and I do hereby declare the following to be a full, clear, and exact description thereof, which will enable those skilled in the art to make and use the same, reference being had to the accompanying drawing, forming part of this specification, in which drawing—

Figure 1 represents a plan or top view of this invention when the parts are detached.

Figures 2 and 3 are transverse sections thereof, taken, respectively, in the planes indicated by the lines *x x* and *y y*, fig. 1.

Similar letters indicate corresponding parts.

This invention relates to a railroad-frog, which is combined with chairs at its ends, made to support both the frog and the rails, and provided with holes in such a manner that each chair can be readily bolted to the frog, or the frog, together with the chair, can be bolted or spiked down to a tie, and that by said chairs the rails are firmly supported, and, if the rails should differ in thickness or height, they can be readily adapted to the frog, simply by changing the chairs or by introducing an additional thickness of sheet-iron between the chairs and the rails. The ends of the frog are slotted and dovetailed to receive the necks of the rails, and retain the same firmly in position, and said frog is provided with lugs or ears, at or near its ends, so that the same can be firmly and conveniently secured to the ties, and that the frog is not liable to spring up or become displaced.

In the drawing—

The letter A designates the body or main part of my frog, which may be made of cast-iron, steel, or any other suitable material. The ends of this frog are provided with slots or dovetails *a*, to receive the necks of the rails *b*, as clearly shown in the drawing.

Instead of securing the rails to the frog by bolts passing in a transverse direction, or by straps or other devices which are difficult to apply, I use chairs *c*, which are secured to the under surface of the frog at its ends, and capable of supporting the rails at the proper level with the surface of the frog, the chairs being either bolted to the frog and then spiked down with the frog to the tie, or both the frog and the chair being spiked or bolted to the tie together.

Each of the chairs is provided with a recess, to receive and support the rails, and, if desired, said chairs may be made to extend from one cross-tie to the other.

By these means the rails are firmly supported, an additional hold being provided by the dovetailed ends of the frog against side-thrusts; but, even without those dovetailed ends, the rails being sustained by the chairs which are fastened to the frog, are not liable to be thrown out of their proper position by the trains passing over them, and, furthermore, the frog can be readily adapted to rails of different size simply by changing the chairs, different sizes of which may be kept on hand, or the chairs may be made of wrought-iron plate, and by placing an additional thickness of plate under the rails, said chairs may be adapted to rails of different height; and since the chairs form only a comparatively small portion of the frog, this change can be effected with little expense.

My frog is provided with lugs or ears, *d*, at or near its ends, so that it can be firmly spiked or bolted upon the ties, either simultaneously with or independent of the chairs.

By these means a railway-frog is obtained which forms a firm support for the rails, and which can be readily adapted to rails of different size, and my invention is very essential for reversible steel-frogs.

Having thus described my invention,

What I claim as new, and desire to secure by Letters Patent, is—

1. The arrangement of a chair, *c*, under one or both ends of the frog A, substantially as and for the purpose described.

2. The arrangement of dovetailed ends *a*, in the frog A, substantially as set forth.

This specification signed by me, this 21st day of May, 1869.

GEO. WESTINGHOUSE, JR.

Witnesses:
W. HAUFF,
E. F. KASTENHUBER.